May 20, 1924.
M. K. JENKINS
EGG SEPARATING MECHANISM
Original Filed April 8, 1922
1,494,602
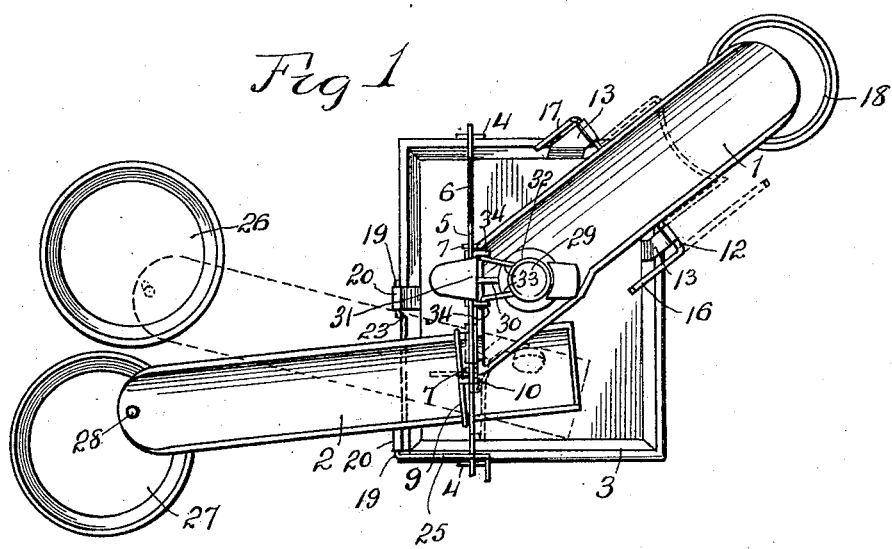
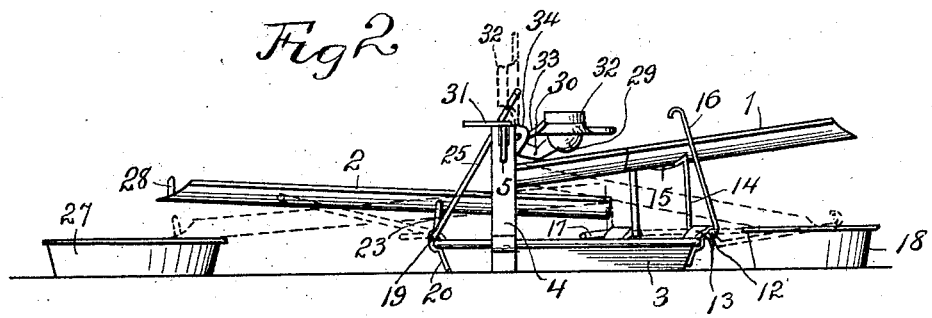
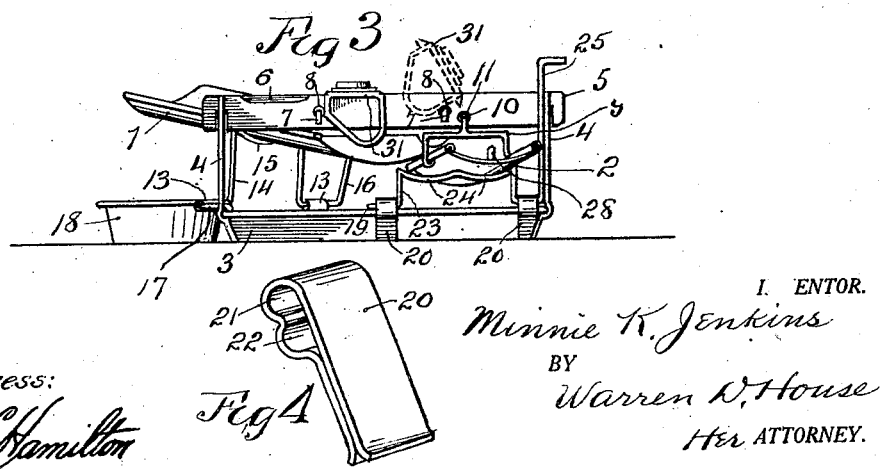
Witness:
R. E. Hamilton
INVENTOR.
Minnie K. Jenkins
BY
Warren D. House
HER ATTORNEY.

Patented May 20, 1924.

1,494,602

UNITED STATES PATENT OFFICE.

MINNIE K. JENKINS, OF CHICAGO, ILLINOIS.

EGG-SEPARATING MECHANISM.

Application filed April 8, 1922, Serial No. 550,690. Renewed December 20, 1923.

*To all whom it may concern:*

Be it known that I, MINNIE K. JENKINS, a citizen of the United States, residing at Chicago, in the county of Cook and State of Illinois, have invented a certain new and useful Improvement in Egg-Separating Mechanisms, of which the following is a specification.

My invention relates to improvements in egg separating mechanisms.

One of the objects of my invention is to provide a novel egg separating means by which the yolks and whites may be separated from each other and from eggs having broken yolks and with which the whites and yolks of bad eggs may be prevented from contaminating good ones.

A further object of my invention is to provide an egg separating mechanism of the kind described which is simple, cheap to make, sanitary, durable, not liable to get out of order, which is efficient in operation, and which has capacity for large production.

A further object of my invention is to provide simple and novel means for breaking the yolks of separated eggs.

The novel features of my invention are hereinafter fully described and claimed.

In the accompanying drawing, which illustrates the preferred embodiment of my invention, Fig. 1 is a plan view of my improved egg separating mechanism.

Fig. 2 is a side elevation of the same.

Fig. 3 is a front elevation of the same.

Fig. 4 is an enlarged perspective view of one of the spring clips.

Similar reference characters designate similar parts in the different views.

My improved mechanism provides two egg containers comprising respectively two troughs 1 and 2 which are pivotally mounted on a suitable support which may comprise a tray 3, to opposite ends of which are secured the lower ends of two standards 4, the upper ends of which are slotted and have fitted therein a horizontal plate 5, disposed edge up, and which may be provided with a knife edge 6, upon which the shells of the eggs to be separated may be broken.

The trough 1 is disposed at one side of the plate 5, and has its adjacent end closed and provided with two hooks 7, which are pivotally mounted in two holes 8, in the plate 5.

The trough 2 has secured to it a yoke 9 having a hook 10 which is pivotally mounted in a hole 11, provided in the plate 5. The trough 2 has its end which is adjacent to the plate 5, closed, and its other end open.

The troughs 1 and 2 are arranged to swing vertically from a holding position shown in solid lines in Fig. 2 to discharge positions shown in dotted lines in said figure. The troughs are arranged to swing by gravity to said discharge position.

For lifting the trough 1 from the discharge position to the holding position, I provide a wire U-shaped member 12, which is pivoted in two clips 13, which may be releasably attached to two sides of the tray 3. The member 12 intermediate of the clips 13 has an inverted U-shaped portion 14 provided in its upper end with an arcuate seat 15, adapted to receive the trough 1. The member 12 has at one end an arm 16 by which the member may be swung. When the arm 16 is swung to the position shown in solid lines in Figs. 1, 2 and 3, the U-shaped portion 14 will swing past the vertical and will raise the trough 1 to and hold it in the holding position. The end of the member 12 opposite the arm 16 is provided with an arm 17 which will bear against the top of the tray 3, for supporting the U-shaped portion 14 in the holding position. By swinging the arm 16 to the dotted position shown in Figs. 1 and 2, the tray 1 will be permitted to swing by gravity to the discharge position, in which position whites of eggs deposited in the trough 1 will be discharged into a receptacle 18.

By raising the trough 1 at its open end, it is adapted to discharge into the trough 2, if the open end be swung upwardly to a proper distance and the trough tilted laterally, the size of the holes 8 permitting of such lateral tilting.

For supporting the trough 2 in the holding position, shown in solid lines in Figs. 2 and 3, I provide a swinging member 19 which may consist of a piece of wire pivoted in two clips 20, one of which is shown in Fig. 4, and which consists preferably of sheet spring metal doubled on itself and adapted to engage the side of the tray 3. Each clip 20 has at its upper end a barrel portion 21, in which is pivoted the wire member 19. Each member 20 below the barrel portion 21 has a channel portion 22, adapted to fit the wired upper end of the tray.

The member 19 has an inverted U-shaped portion 23, the transverse portion of which has two arcuate seats 24, adapted to receive and support the trough 2 in the holding position shown in solid lines in Figs. 2 and 3. The trough 2 is adapted to be swung laterally on the plate 5, through the intermediacy of the yoke 9 and hook 10, to the two positions shown in solid and dotted lines respectively in Fig. 1. When in either of these two positions, the trough 2 will be in one of the seats 24, when the swinging member 19 is in the holding position shown in Fig. 2, in which position the U-shaped portion 23 will incline slightly inwardly and upwardly from the vertical, so that the weight of the trough 2 will retain the supporting portion 23 in the holding position.

To swing the member 19 to and from the holding position, one end of said member is provided with an arm 25, which is adapted to be swung against the plate 5, to limit the inward swinging of said arm, after the portion 23 has been swung slightly past the vertical.

When the trough 2 is in the position shown in dotted lines in Fig. 1, said trough is adapted to discharge into a receptacle 26.

When the trough 2 is in the position shown in solid line in Fig. 1, it is adapted to discharge into a receptacle 27. The latter may be employed to hold yolks. To break the yolks, as they pass out of the trough 2, suitable means may be provided, such as an upright pin 28, which has its lower end fastened to the middle and bottom of the trough 2 adjacent to the outer end of the latter.

The receptacle 26 may be employed to hold eggs in which the yolks have been broken before being separated from the whites. The receptacles 18, 26 and 27 may be of any desired shape and capacity.

Any suitable means may be provided for separating the yolks and the whites. In the drawings I have shown for this purpose, an ordinary egg separating device comprising a bowl 29 having an arm 30 attached to a frame 31 which rests upon the upper edge and embraces opposite sides of the plate 5, and which is adapted to be slid on the plate 5 from a position over the trough 1 to a position over the trough 2 and then tilted to the position shown in dotted lines in Fig. 3, so as to have the cup 29 deposit a yolk carried therein into the trough 2. For cutting the white from the yolk, there is provided a ring member 32 adapted to fit over the upper end of the cup 29 and which has two arms 33 respectively pivoted to two ears 34 provided on the frame 31.

In the operation of my invention, the egg shell is broken on the knife edge 6 and the yolk with the white are deposited in the cup 29 when the latter is in the position shown in solid lines in Fig. 1, over the trough 1. The latter is disposed in the holding position shown in solid lines in Fig. 2, and also in Fig. 3.

The operator smells the egg, and if the latter is found to be bad, the trough 1 and frame 31 are removed and cleansed and then replaced and the operation just above described of depositing a white and a yolk in the cup 29 is repeated. If the yolk is broken and the egg is found to be good, the outer end of the trough 1 is tilted upwardly to permit the portion of the egg contained therein to pass into the trough 2, which at the time is in the holding position, and the frame 1 is slid and tilted so as to discharge the contents of the cup 29 into the trough 2, after which the latter is swung laterally and lowered so as to discharge the yolk broken egg with its white into the receptacle 26.

If the egg which has been broken and the yolk discharged into the cup 29 is a good egg, and the yolk is unbroken, the ring member 32 is swung from the position shown in dotted lines in Fig. 2 to the position shown in solid lines in said figure, thus cutting the depending white of the egg from the yolk. The white of the egg will be caught in the trough 1 which is in the holding position, and the yolk is discharged from the cup 29 into the trough 2, which is also in the holding position, as already described. The trough 2 is swung laterally and lowered so as to discharge the yolk into the receptacle 27, the pin 28 breaking the yolk as it is discharged from the trough. The arm 16 is then swung to lower the trough 1 to the discharge position shown in dotted lines in Fig. 2, upon which the white of the egg will be discharged into the receptacle 18.

From the foregoing, it will be understood that in separating the eggs, the bad eggs may be caught and removed without contaminating the whites or yolks of eggs that have been already separated; that the whites and yolks of good eggs may be separated from each other and deposited in separate containers, and good eggs with broken yolks can all be discharged into the receptacle 26.

As the frame 31 can readily be removed from the plate 5, and the latter being removable from the standards 4, and the troughs 1 and 2 being detachable from the plate 5, and the members 12 and 19 being detachable from the tray 3, the parts may be easily and quickly and thoroughly cleansed, thus affording a sanitary apparatus.

The tray 3 will catch drippings from the plate 5 and from the troughs 1 and 2.

The troughs 1 and 2 may be quickly swung to the holding position by swinging the arms 16 and 25 from the positions shown in dotted lines in Fig. 2 to the positions shown in solid lines in said figure.

I do not limit my invention to the structure shown and described, as many modifications, within the scope of the appended claims, may be made without departing from the spirit of my invention.

What I claim is:—

1. In an egg separating mechanism of the kind described, a support, an egg container pivoted to the support so as to be swung in a vertical plane to and from a holding position and arranged to be swung laterally to two discharge positions, and means for releasably supporting the container in the holding position, substantially as set forth.

2. In an egg separating mechanism of the kind described, a support, a trough pivoted thereon on vertical and horizontal axes so as to swing vertically and laterally and having a closed end and adapted to hold an egg when swung vertically to a holding position, and means for releasably supporting the trough in the holding position, substantially as set forth.

3. In an egg separating mechanism of the kind described, a support, two egg containers, each movable on said support to and from a holding position, one of said containers being arranged to be swung in one direction to a discharge position and arranged to be swung in another direction from the holding position to another discharge position, and when in the last named position being adapted to discharge into the other container, and means by which the containers are releasably held in the holding position, substantially as set forth.

4. In an egg separating mechanism of the kind described, a support, and two troughs pivoted to said support and having each a closed end, and arranged each to be swung vertically to and from a holding position, one of the troughs being arranged to swing laterally to two discharge positions, the other trough being arranged to be swung from the holding position so as to discharge into the other trough, substantially as set forth.

5. In an egg separating mechanism of the kind described, a support, two troughs pivoted thereto and arranged to swing by gravity to a discharge position, each trough having a closed end and being arranged to be swung to a holding position, one trough being arranged to be swung so as to discharge into the other trough, the other trough being arranged to be swung laterally to two discharge positions, and means for releasably supporting the troughs in the holding position, substantially as set forth.

6. In an egg separating mechanism of the kind described, a support, two containers movable thereon to and from a holding position, means for releasably supporting said containers in the holding position, and a yolk holder mounted on said support and movable thereon from a holding position over one container to a discharge position over the other container, substantially as set forth.

7. In an egg separating mechanism of the kind described, a support, two containers movable thereon to and from a holding position, one of the containers being movable to a position in which it will discharge into the other container and also movable so as to discharge at another place, means for releasably supporting the containers in the holding position, and a yolk holder mounted on said support and movable thereon from a holding position over one container to a discharge position over the other container, substantially as set forth.

8. In an egg separating mechanism of the kind described, a support, two containers movable thereon in vertical planes, one of the containers being movable laterally to two discharge positions, the other container being arranged to be swung from a holding position so as to discharge into the laterally movable container and also to discharge at another place, both containers being arranged to be swung to a holding position, means for releasably supporting the containers in the holding position, and a yolk holder mounted on said support and movable thereon from a holding position over one container to a discharge position over the other container, substantially as set forth.

9. In an egg separating mechanism of the kind described, a support, two troughs pivoted thereto, each having a closed end and arranged to be swung vertically in one direction from a holding position to a discharge position, one trough being arranged to be swung in the other direction so as to discharge into the other trough, the last named trough being arranged to be swung laterally to two discharge positions, a yolk holder mounted on said support and movable from a holding position over one trough to a discharge position over the other trough, and means for releasably supporting the troughs in the holding position, substantially as set forth.

10. In an egg separating mechanism of the kind described, a support, two troughs, each having a closed end, pivoted to said support and arranged to have their open ends swing downwardly by gravity to a discharge position, one trough being arranged to be swung from a holding position so as to discharge into the other trough, the other trough being arranged to swing laterally to two discharge positions, and means carried by said support for swinging said troughs to and holding them in the holding position, substantially as set forth.

11. In an egg separating mechanism of the kind described, a support, two troughs, each having a closed end, pivoted to said support and arranged to have their open ends swing downwardly by gravity to a discharge position, one trough being arranged to swing from a holding position so as to discharge into the other trough, the other trough being arranged to swing laterally to two discharge positions, means carried by said support for swinging said troughs to and holding them in the holding position, and a yolk holder movable on said support from a holding position over one trough to a discharge position over the other trough, substantially as set forth.

12. In an egg separating mechanism of the kind described, a support, an egg container movable thereon to and from a discharge position and provided with yolk breaking means, and means for releasably supporting the container in the holding position, substantially as set forth.

13. In an egg separating mechanism of the kind described, a support, a container movable thereon from a holding position to a discharge position and having means for breaking a yolk as the latter is being discharged from the container, and means for releasably supporting the container in the holding position, substantially as set forth.

14. In an egg separating mechanism of the kind described, a support, a trough, having a closed end, pivoted on said support so as to swing from a holding position to a discharge position and having a pin arranged to engage and break a yolk when the trough is tilted to the discharge position, and means for releasably supporting the trough in the holding position, substantially as set forth.

In testimony whereof I have signed my name to this specification.

MINNIE K. JENKINS.